Sept. 20, 1955     L. A. RICHARDS     2,718,141
ELECTRO-THERMAL ELEMENT FOR MEASURING
MOISTURE IN POROUS MEDIA
Filed Jan. 25, 1952
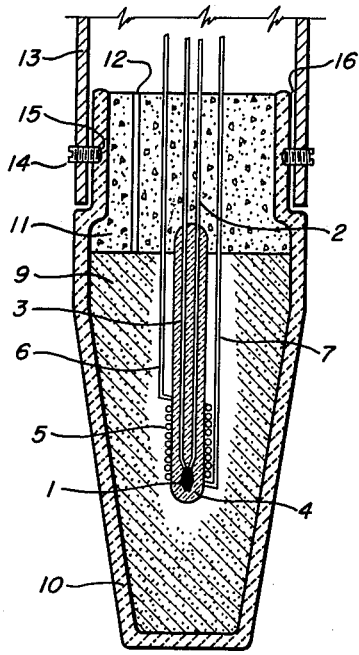
FIG. I
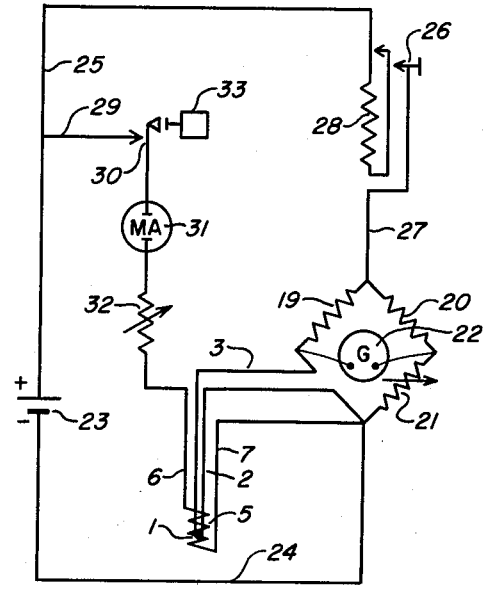
FIG. III
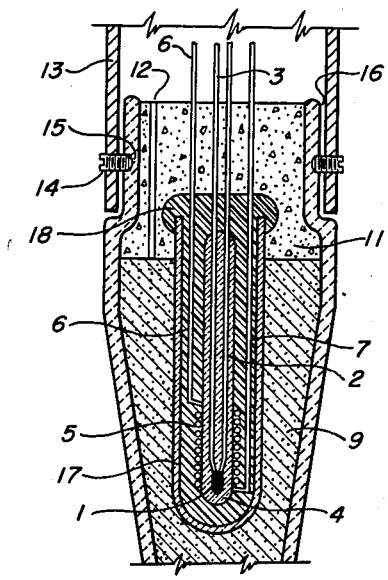
FIG. II
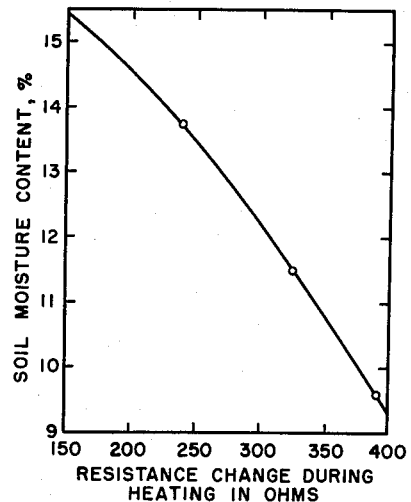
FIG. IV
INVENTOR.
LORENZO A. RICHARDS
BY
AGENT

United States Patent Office 2,718,141
Patented Sept. 20, 1955

2,718,141

ELECTRO-THERMAL ELEMENT FOR MEASURING MOISTURE IN POROUS MEDIA

Lorenzo A. Richards, Riverside, Calif.

Application January 25, 1952, Serial No. 268,253

9 Claims. (Cl. 73—75)

My invention relates to means for measuring moisture by making use of the fact that the thermal diffusivity of porous media depends on the moisture content. Among the objects of my invention are:

First, to provide means for continuously measuring in situ, the moisture content of soil in the root zone of plants so that irrigation water can be applied when the moisture content is reduced to a predetermined level.

Second, to provide means for measuring continuously in situ, the moisture content of earth materials in dams, highway sub-grades, under airfields, and under building foundations.

Third, to provide means for measuring moisture content or condition in industrial materials such as foundry sands.

Fourth, to provide means for measuring the liquid content of any porous medium containing any limpid, wetting liquid at contents less than saturation.

Fifth, to provide means for measuring the moisture tension of water in agricultural soils, in earthen dams, foundations, and sub-grades, and also in industrial materials such as foundry sands.

With the above and other objects in view as may appear hereinafter, reference is directed to the accompanying drawings, in which:

Figure I is a sectional view of an electro-thermal element mounted in a standard porous medium within a porous cup.

Figure II is a sectional view similar to Figure I, but with the electro-thermal element mounted in a protective envelope of glass and plastic to provide exceptionally long life, particularly in corrosive porous media, e. g., soils which are saline or corrosive.

Figure III is a wiring diagram for a heating circuit and a Wheatstone bridge circuit used for making the electro-thermal measurements.

Figure IV is a graph showing the response of my electro-thermal element to soil moisture under growing plants.

The operation of my device is based on the fact that if a temperature measuring element and a contiguous heat source are buried in a porous medium, the temperature rise occasioned by a standard rate of heating for a standard length of time will depend on the moisture content of the surrounding porous medium. The theoretical basis for this heat flow problem is contained in the equation $$\nabla^2 \theta = \frac{C}{k} \frac{d\theta}{dt}$$

when $\nabla^2$ is the La Placian operator $\theta$ is the temperature $C$ is the heat capacity per unit volume $k$ is the thermal conductivity $\dfrac{d\theta}{dt}$ is the rate of change of temperature with time It is apparent that for certain rate of entry of heat into a unit volume of medium as represented by the left-hand side of the equation, the rate of temperature rise is proportional to the ratio $C/k$ which is called the thermal diffusivity. The dependence of thermal diffusivity on the moisture content of the soil has long been known, but attempts to use this dependence in a practical method for measuring soil moisture have not been successful because no satisfactory method has heretofore been found for establishing a reliable and reproducible moisture contact between the electro-thermal element and the soil. The electro-thermal element must be kept small and light to minimize the time required for readings. Thus, three principal difficulties have been encountered: (1) The electro-thermal elements are small and light, and hence, delicate. Direct mounting in the medium to be measured requires great care to prevent damage to the element and to prevent such a disturbance to the medium that calibration will be inaccurate. (2) Contact between the measuring element and the medium is critical. Structural changes associated with wetting and drying, root action or motion of the connecting wires has changed contact relations and spoiled the readings because of a change of calibration. (3) Attempts to mount electro-thermal units in a standard medium have not been successful because of failure to find a standard medium for which the moisture absorbing and transmitting characteristics were satisfactory.

My electro-thermal element completely overcomes the above difficulties. For purposes of explanation, attention is directed to Figures I, II, III, and IV.

Figure I shows in cross section a typical mounted electro-thermal element suitable for placing in a porous medium, the moisture content of which is to be determined. This unit consists of a resistance thermometer 1, having electrical leads 2 and 3. Illustrated is a typical bead type thermistor which consists of a small bead of semi-conducting material enclosed in a glass envelope 4. Thermistors of this type are commercially available and particularly suitable for temperature measurement. One which has been found to be satisfactory is a type 14–B Western Electric thermistor. A small heating coil 5 is wound around the resistance thermometer and sealed thereto by means of a chemically resistant, electrically insulating varnish or lacquer. A particularly desirable heating coil consists of 3.5 ohms of No. 32 B. & S. gauge enameled constantan wire. Leads 6 and 7 from opposite ends of the heating coil 5 may be the same constantan wire or other electric conductors. This electro-thermal element is mounted in a standard porous medium, e. g., soil 9 which is contained in a porous ceramic cup 10. The porosity and moisture properties of the porous medium and the ceramic cup are important and will be later specified.

The electro-thermal element and the porous medium are sealed in the ceramic cup by means of seal 11 which may be of dense, hard, water-setting ceramic cement or grout such as that used in setting ceramic tile. The seal may alternatively be made with Dekhotinsky cement, sealing wax or other material capable of withstanding moisture and having sufficient rigidity to adequately support the electro-thermal element. Depending upon the porosity to moisture and air of the ceramic cup, in some instances it is desirable to have a small vent 12 extending through seal 11.

In order to provide protection for the electrical leads and to permit handling of the electro-thermal assembly, including the porous cup, particularly when the unit is to be placed underground, a tube 13 is fastened to the upper portion of porous cup 10. Tube 13 may be metal, as illustrated, such as iron pipe, stainless steel tubing, copper tubing or the like, or it may be a rubber, synthetic rubber or plastic hose or tubing. In the case of rigid tubing the ceramic cup may be held in place by means of setscrews 14 which engage recesses 15 in the porous cup.

If desired, the metal tube may be sealed or cemented to the upper end of the porous cup by means of a suitable sealing compound or cement to effect a seal in the annular space 16.

Figure II is a sectional view of a mounted electro-thermal element suitable for use in corrosive porous media such as saline soils and the like. The assembly is similar to that shown in Figure I, however, in this modification the resistance thermometer and heating coil are enclosed in a glass envelope 17, as for example, a glass tube, and embedded and sealed in plastic 18. The plastic which preferably fills the space inside the glass envelope, may be a thermosetting type plastic. Suitable for this purpose is methylmethacrylate with a plasticizer. Preferably the glass parts can be collapsed into close contact with the metal parts by heating.

Figure III shows a standard Wheatstone bridge circuit and a heating circuit suitable for use in connection with the electro-thermal element for determining moisture contents of porous media. The bridge circuit has fixed arms 19 and 20, a variable balancing and measuring resistor at 21 and the fourth leg consists of the resistance thermometer 1 connected to the bridge circuit by means of electrical conductors 2 and 3. A galvanometer 22 or other means of indicating flow of current through the bridge, e. g., a microammeter, permits balancing the bridge circuit by varying resistor 21. Electric current is supplied to the bridge by means of a single cell battery 23 or other equivalent electrical source through conductor 24 and through conductor 25, switch 26 and conductor 27 or alternatively through conductor 25 resistance 28 and conductor 27, depending upon whether switch 26 is fully depressed or only partially depressed, respectively. Switch 26 provides high sensitivity and low sensitivity, respectively, when fully or partially depressed.

Current is supplied to heating coil 5 through conductors 7 and 24, and conductors 25 and 29, switch 30, milliammeter 31, variable resistance 32 and conductor 6. Switch 30 may be manually controlled or may be controlled by a time clock indicated at 33.

Figure IV presents typical data obtained in soil in a pot in which plants were growing, showing change in resistance of a thermistor during a heating time of one minute, using a heating current of 0.15 ampere at various soil moisture contents. In this instance the soil moisture content was determined by weighing the pot and contents at the time of making the resistance measurements.

My electro-thermal units are particularly designed for burying and leaving buried in soil or earth materials in which it is desired from time to time to measure in situ the moisture content or condition. Moisture changes in soil in the field are sufficiently slow that the moisture condition of the standard medium within the porous ceramic cup is responsive to and remains substantially at hydraulic equilibrium with the externally surrounding medium. Electro-thermal units can however be shifted about and installed for single moisture determinations at a given place.

In using my device to determine soil moisture contents, the porous cup containing the heating coil and resistance thermometer as shown in Figures I and II, is inserted in the soil or other porous media, the moisture content of which is to be determined. After sufficient time has elapsed for the moisture conditions in the porous medium and the standard soil in the porous cup to reach equilibrium, approximately 2 to 8 hours, a determination of moisture content is made in the following manner: The electrical leads 2, 3, 6 and 7 from the electro-thermal element are connected to the appropriate terminals on a portable bridge set the wiring diagram of which is shown in Figure III. The bridge circuit is balanced by closing switch 26 and adjusting resistance 21 until galvanometer 22 reads zero. The standard heating current, e. g., 0.15 ampere, is then started by closing switch 33 for a standard heating time, e. g., one minute. Since the resistance of the heater 5 is the same for various electro-thermal units, and is independent of temperature, it is necessary to change resistance 32 only infrequently to compensate for battery deterioration and thus maintain standard heating current. Toward the end of the standard heating time the bridge circuit is kept balanced by closing switch 26 and adjusting resistance 21 to maintain zero current through the galvanometer 22. This process of keeping the bridge balanced is discontinued at the end of the heating period. Preferably switch 33 is clock or timer controlled so that the switch is opened automatically after the standard heating period and an audible signal is simultaneously given.

The difference in resistance of the resistance thermometer as indicated by the difference in the resistance of resistor 21 before and after a standard amount of heat has been supplied by means of heater 5 is readily converted to percentage of moisture. The electro-thermal units will, of course be calibrated under known conditions. A simple method of calibration is to determine moisture content of a given porous medium by weight and determine the resistance change at several moisture contents. From such data a curve showing moisture content versus resistance change can be plotted, such as the one illustrated in Figure IV.

Thermistors, above described, are particularly suitable for use as resistance thermometers in my apparatus because the fractional change in the resistance of the thermistors used is nearly constant for each degree of temperature change. The resistance of the thermistors has an exponential relation to temperatures of the form $$R = a10^{-mT}$$

where $a$ and $m$ are constants
$R$ = resistance of the thermistor
$T$ = temperature of the thermistor For the thermistors used $a = 3.740$ and $m = 0.0178$.

In logarithmic form the above equation may be written as $$T_2 = (\log R_2 - \log a)/m$$

and $$T_1 = (\log R_1 - \log a)/m$$

Where $T_2$ and $R_2$ are the temperature and resistance, respectively, of the thermistor after heating and $T_1$ and $R_1$ are the temperature and resistance, respectively, of the thermistor before heating, subtracting gives $$T_2 - T_1 = \Delta T = \frac{1}{m}\left(\log \frac{R_2}{R_1}\right)$$

$$R_1 - R_2 = \Delta R$$

For those porous media where thermal capacity $C$ and conductivity $k$ do not change rapidly with temperature, the moisture content of the medium will be more closely related to $\Delta T$ than $\Delta R$. In accordance with the above equations, this would be taken into account by using calibration curves for relating moisture content to the ratio $R_2/R_1$ instead of to $\Delta R$. Practically, this would be taken into account by having different calibration curves for $\Delta R$, corresponding to different ranges in the initial resistance reading of the thermistor.

The porous cups shown at 10 in Figures I and II should be readily permeable to water. It has been found that a wall thickness of 3 mm. with a permeance to water of about 1 milliliter per minute at a pressure difference of 1 atmosphere is satisfactory. To allow replacement of air within the cup by water during wetting, the air entry value for the cup wall when wet, should be less than 0.1 atmosphere. Alternatively an air vent must be made either through the cup wall or through the seal at the top as shown at 12 in Figures I and II.

The porous ceramic cups are preferably of the general shape shown in the drawing. The flat bottom is advantageous in that it provides a stable base for the cup, the tapered cylindrical shape makes satisfactory contact in the hole made by commercial types of soil tube samplers. The restricted neck provides a ready place of attachment for a pipe or tubing and permits a flange at the lower end of plug 11 which increases the solidity or stability of the plug. Although this is the preferred design, other shapes may be employed as would be apparent. Moreover, the porous cups are preferably about 85 mm. in length and about 31 mm. in outside diameter at the greatest diameter. Somewhat larger or smaller cups may be used. It is to be noted, however, that as the diameter of the cup increases the time required for the standard medium to reach equilibrium condition with the porous medium, the condition of which is being determined is somewhat increased.

The capillary properties of the porous medium used to embed the electro-thermal unit in the cup are important and must be chosen with care.

The physical or hydraulic condition of moisture in porous media can be designated in terms of suction, or moisture tension. Soil moisture tension is defined as the pressure reduction that must be maintained across a permeable membrane in order to bring about hydraulic equilibrium between free water that is not subject to surface force action and absorbed water in the soil that is subject to surface force action. The moisture content of soil at any given soil moisture tension can be determined by pressure membrane apparatus such as described in U. S. Patent 2,353,760.

It is the gradient in the soil moisture tension that determines the direction of absorbed liquid or film flow in porous media. At equilibrium the soil moisture tension in the standard medium inside the porous cup (Figures I and II) will be the same as in the soil outside the cup. Unforunately, there is a hysteresis effect in the relation between moisture tension and moisture content for porous media. If, as is the case for irrigation control in agricultural soils, it is desired to measure the change in tension with time after thorough wetting, then once calibrated against moisture tension for the moisture release process extending from saturation, these electro-thermal units can be used to measure moisture tension in any soil with which they were in contact during the wetting process and in which they are allowed to remain at equilibrium during the drying out process. The standard capillary medium within the cup should be chosen so that the rate of change of moisture content with tension is made as large as possible over the tension range in which the unit is to be used.

In measuring soil moisture for agricultural purposes, the tension range to be covered is from 0 to 15 atmospheres. This range will be very useful also for many soil mechanics and foundation engineering purposes. Since all soils have the same general hyperbolic relation between moisture content and tension, it has been found that the best standard medium for surrounding the electro-thermal unit is a very fine sandy loam, low in organic matter, with enough sand to give some stable large pores and not so much clay as to undergo large swelling and shrinking changes with wetting and drying. Also, the specific surface of the standard medium must be sufficiently high to give rapid transmission of moisture at low moisture contents. A soil that has given best results thus far has had the following particle size distribution as determined from water sedimentation rates:

|  | Diameter of Particles, mm. | Percent |
| --- | --- | --- |
| Very Coarse Sand | 2–1 | 9.4 |
| Coarse Sand | 1–0.5 | 8.7 |
| Medium Sand | 0.5–0.25 | 3.5 |
| Fine Sand | 0.25–0.1 | 9.1 |
| Very Fine Sand | 0.1–0.05 | 28.7 |
| Silt | 0.05–0.002 | 32.9 |
| Clay | 0.002–0 | 7.7 |

Soil having the above specification is air-dried, passed through a 2 mm. sieve and packed with gentle tamping around the electro-thermal unit in the porous cell.

Although the above soil has been found to be particularly satisfactory, it is to be realized that soils of other types may be employed. In some instances, where maximum precision must be realized, and where hysteresis effects must be minimized, it is desirable to use within the cup a porous material of the same type as that in which moisture or moisture tension is to be determined. Under average conditions, however, for reasons connected with pore size distribution, low shrinkage, and good water conductivity, as enumerated above, the medium used for embedding the electro-thermal unit within the porous cup should have a wide distribution of particle sizes with a peak in the very fine sand and silt sizes. The clay preferably should not be of the expanding lattice type, such as montmorillonite. Preferably the embedding media will contain a major proportion of very fine sand and silt of particle size ranging between about 0.002 and 0.1 mm. diameter and a minor proportion of clay finer than about 0.002 mm. diameter and sand coarser than 0.1 mm. diameter.

Embedding media such as represented by the following table lie within the scope of my invention:

|  | Diameter of Particles, mm. | Percent |
| --- | --- | --- |
| Very Coarse Sand | 2–1 | 7–12 |
| Coarse Sand | 1–0.5 | 7–12 |
| Medium Sand | 0.5–0.25 | 7–12 |
| Fine Sand | 0.25–0.1 | 7–12 |
| Very Fine Sand | 0.1–0.05 | 25–35 |
| Silt | 0.05–0.002 | 25–35 |
| Clay | 0.002–0 | 5–10 |

Though I have shown and described certain embodiments of my invention, I do not wish to be limited thereto, but desire to include all novelty in the appended claims.

I claim:

1. An apparatus for determining the moisture condition of porous media comprising a resistance thermometer, a heater element adjacent said thermometer, said resistance thermometer and heater element being embedded in a porous medium contained in a porous ceramic cup, means for supplying electric current to said heater element and means responsive to changes in resistance of said resistance thermometer.

2. An apparatus for measuring the moisture condition of soil which comprises, a porous ceramic cup containing a porous medium, a resistance thermometer, a heater element encircling said thermometer and electrically insulated therefrom, said thermometer and heater element being embedded in a stationary position in said porous medium contained in said porous cup, means for supplying electric current to said heater element and means responsive to changes in resistance of said resistance thermometer, said porous medium contained in said porous cup being soil containing a major proportion of very fine sand and silt having a particle size varying between 0.002 and 0.1 mm. diameter.

3. An apparatus according to claim 1 in which said porous medium contained in said porous cup is substantially the same as the porous media the moisture condition of which is to be determined.

4. An apparatus according to claim 1 in which said resistance thermometer and said heater element are enclosed in a glass envelope.

5. An apparatus according to claim 1 in which said resistance thermometer is one in which the resistance has an exponential relation to temperature according to the formula $R = a10^{-mT}$, where $a$ and $m$ are constants, R is resistance and T is temperature.

6. An apparatus for measuring the moisture condition of porous media which comprises, a porous ceramic cup containing a porous medium, a resistance thermometer, a heater element encircling said thermometer and electrically insulated therefrom, means for supporting said thermometer and said heater element in said porous medium in said porous cup, means for supplying electric current to said heating element and means for determining changes in resistance of said resistance thermometer, said porous cup containing said thermometer, heater element and porous medium being adapted to be placed in the porous media, the moisture content of which is to be determined.

7. An apparatus for measuring the moisture condition of soil which comprises a porous ceramic cup having an opening at one end and containing a standard porous medium, an electro-thermal unit comprising a resistance thermometer and a heating element encircling said resistance thermometer embedded in said porous medium, means comprising a seal in the open end of said porous cup for maintaining said porous medium in fixed position in said porous cup and for supporting said electro-thermal unit, means for supplying an electric current to said heating element and means for measuring resistance change of said resistance thermometer.

8. An apparatus for measuring the moisture condition of porous media which comprises a porous ceramic cup containing a porous medium, moisture sensitive electrical means positioned within said porous ceramic cup and in contact with the porous medium, means for supplying electric current to said moisture sensitive electrical means and means responsive to changes in the electrical characteristics of said moisture sensitive electrical means.

9. An apparatus for measuring the moisture condition of porous media which comprises a porous ceramic cup containing a porous medium substantially the same as said porous media, the moisture condition of which is to be determined, moisture sensitive electrical means positioned within said porous cup and in contact with the porous medium, means for supplying electric current to said moisture sensitive electrical means and means responsive to changes in the electrical characteristics of said moisture sensitive electrical means.

References Cited in the file of this patent

UNITED STATES PATENTS

| | | |
|---|---|---|
| 1,741,231 | Grondhal | Dec. 31, 1929 |
| 2,007,231 | Budgett | July 9, 1935 |
| 2,343,520 | Baver | Mar. 7, 1944 |
| 2,362,344 | Baver | Nov. 7, 1944 |